(12) United States Patent
Pandey

(10) Patent No.: US 9,723,017 B1
(45) Date of Patent: Aug. 1, 2017

(54) METHOD, APPARATUS AND COMPUTER PROGRAM PRODUCT FOR DETECTING RISKY COMMUNICATIONS

(71) Applicant: EMC Corporation, Hopkinton, MA (US)

(72) Inventor: Sanjiv Pandey, Hayward, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 9 days.

(21) Appl. No.: 14/755,298

(22) Filed: Jun. 30, 2015

Related U.S. Application Data

(62) Division of application No. 13/332,845, filed on Dec. 21, 2011, now abandoned.

(51) Int. Cl.
*H04L 29/06* (2006.01)
*H04L 29/08* (2006.01)

(52) U.S. Cl.
CPC .......... *H04L 63/1433* (2013.01); *H04L 67/22* (2013.01)

(58) Field of Classification Search
CPC ..... G06F 21/577; G06F 21/6263; G06N 5/02; G06Q 10/10; H04L 63/0421; H04W 12/02
See application file for complete search history.

(56) References Cited

U.S. PATENT DOCUMENTS

2010/0024042 A1* 1/2010 Motahari .............. G06F 21/577
726/26

* cited by examiner

*Primary Examiner* — Brandon Hoffman
*Assistant Examiner* — Nega Woldemariam
(74) *Attorney, Agent, or Firm* — Krishnendu Gupta; Jason A. Reyes

(57) ABSTRACT

There is disclosed herein techniques for use in detecting risky communications. In one embodiment, the techniques comprise a method including the following steps. The method comprises determining entropy in connection with a communication. The method also comprises performing a comparison based on the entropy and historical communications. The method further comprises determining the similarity between the communication and the historical communications based on the comparison.

18 Claims, 3 Drawing Sheets

US 9,723,017 B1

METHOD, APPARATUS AND COMPUTER PROGRAM PRODUCT FOR DETECTING RISKY COMMUNICATIONS

TECHNICAL FIELD

The invention relates generally to the field of information technology (IT). More specifically, the invention relates to fraud detection.

BACKGROUND OF THE INVENTION

In today's high-tech, fast-paced, hyper-connected world, people are spending more and more time on the internet to complete more of their daily activities such as online banking and shopping. The convenience afforded by the access and availability of the online world is, however, not without drawbacks. This increased access has brought with it an unparalleled growth in online fraudulent activity.

Achieving the right balance of security, without compromising the user experience, is therefore a major and ongoing challenge for organizations. Existing authentication systems attempt to solve this challenge by providing risk-based authentication for organizations that want to protect users accessing web sites and online portals, mobile applications and browsers, Secure Sockets Layer (SSL) virtual private network (VPN) applications, web access management (WAM) applications, and application delivery solutions.

Many such existing authentication systems are configured to identify fraudulent users by evaluating a variety of risk indicators. For example, when a user visits a website, the system may look at the user's history and detect if the current session is in conformity with past history, or if it is deviating significantly from past history. This is, typically, achieved by storing the complete details of the session. This data may include username, URL, time of request, user-agent, referrer, device used to initiate the request, and so on.

Unfortunately, the above approach presents a number of problems. For example, over a period of time, this creates a huge data set requiring significant storage. Furthermore, the analysis of this huge dataset has a huge performance penalty. It will be appreciated that such an analysis can be very difficult to perform in real time (i.e., in the order of milliseconds) as reading a plethora of data from storage and bringing it into memory for real time analytics can take longer.

There is, therefore, a need for improved techniques for use is addressing the above problems.

SUMMARY OF THE INVENTION

There is disclosed a method, comprising: determining entropy in connection with a communication; based on the entropy and historical communications, performing a comparison; and based on the comparison, determining the similarity between the communication and the historical communications.

There is disclosed an apparatus, comprising: memory; and control circuitry coupled to the memory, the memory storing instructions which, when carried out by the control circuitry, cause the control circuitry to: determine entropy in connection with a communication; based on the entropy and historical communications, perform a comparison; and based on the comparison, determine the similarity between the communication and the historical communications.

There is also a computer program product having a non-transitory computer readable medium which stores a set of instructions, the set of instructions, when carried out by computerized circuitry, causing the computerized circuitry to perform a method of: determining entropy in connection with a communication; based on the entropy and historical communications, performing a comparison; and based on the comparison, determining the similarity between the communication and the historical communications.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
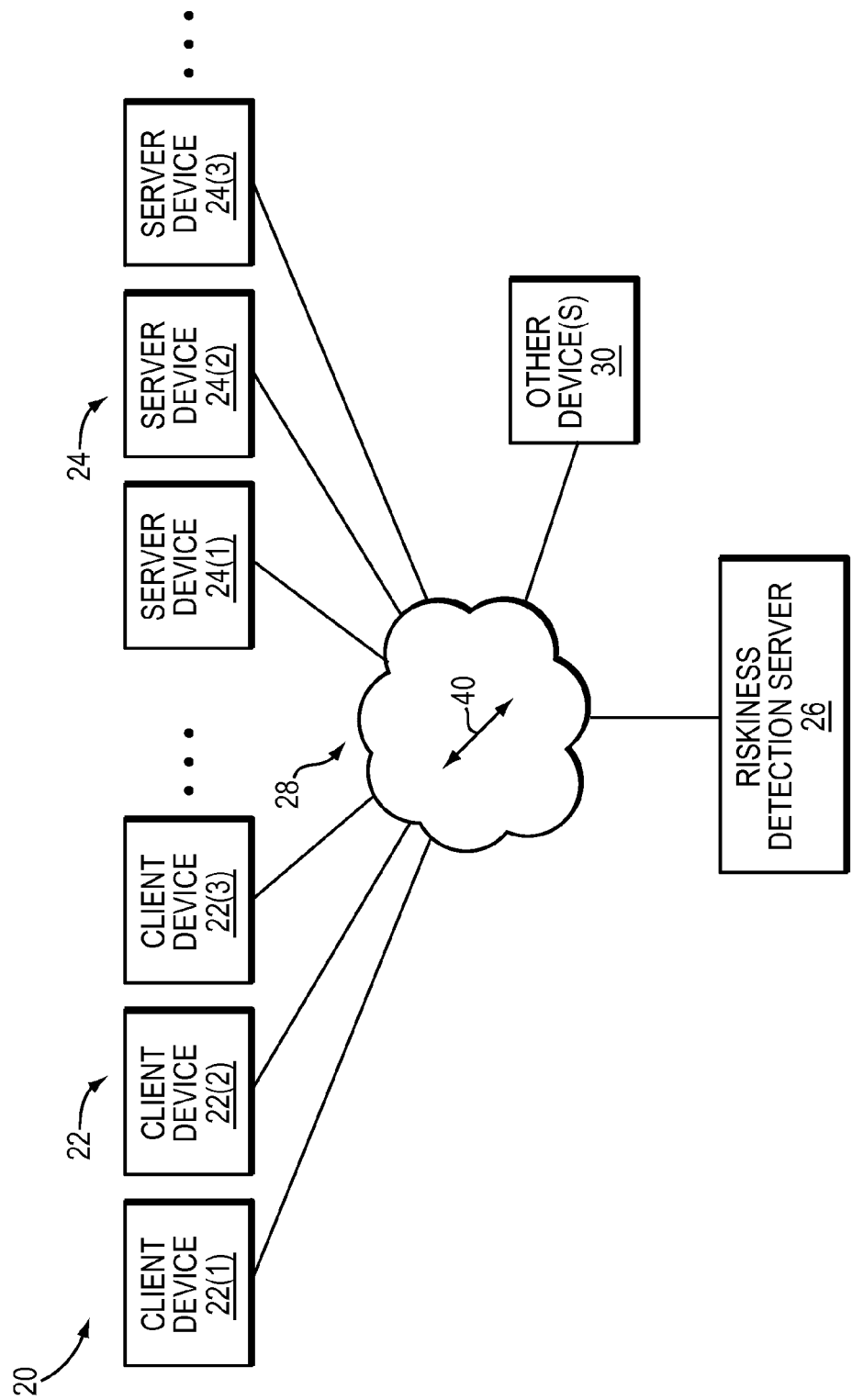
FIG. 1 is a block diagram of an electronic environment which detects communication riskiness.

FIG. 1 shows an electronic environment 20 which is equipped to detect risky communications. The electronic environment 20 includes client devices 22(1), 22(2), 22(3), . . . (collectively, client devices 22), server devices 24(1), 24(2), 24(3), . . . (collectively, server devices 24), a riskiness detection server 26, a communications medium 28, and perhaps other devices 30 as well.

Each client device 22 is constructed and arranged to acquire services from one or more of the server devices 24. Some examples of suitable client devices 22 include computerized user apparatus such as personal computers, laptops, tablets, smart phones, other devices that are capable of running browsers, and the like.

Each server device 24 is constructed and arranged to provide services to one or more of the client devices 22. Some examples of suitable server devices 24 include institutional or enterprise scale server apparatus such as web servers, file servers, and so on.

The riskiness detection server 26 is constructed and arranged to evaluate riskiness of network communications 40 (e.g., HTTP messages sent between sources and destinations) among the various devices 22, 24 of the electronic environment 20. In particular, the riskiness detection server 26 compares new communications with past historical communications resulting in scores being assigned to the new network communications 40. These scores enable assessments to be made as to the similarity of new communications with respect to historical communications. If the new communications are deemed not to be similar then further action may be required, e.g., blocking further communication, flagging for further investigation, prioritizing attention, and so on.

The communications medium 28 is constructed and arranged to connect the various components of the electronic environment 20 together to enable these components to exchange electronic signals. At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, and so on.

The other devices 30 represent miscellaneous apparatus that may share use of the communications medium 28. Examples of other devices 30 include network equipment, ancillary appliances, potentially malicious devices, and so on.

During operation, the various components of the electronic environment 20 communicate with each other to perform useful work. During such operation, the riskiness detection server 26 initially collects network data in connection with communications over a period of time. This collection of data enables the server to create a historical record by which the server can compare future communications. However, rather than storing the entire data set associated with these communications, the server 26 determines the entropy in connection with the communications resulting in N historical user sessions being represented by N floating point numbers.

After completion of the above initial stage, the riskiness detection server 26 determines the entropy in connection with a new communication. Furthermore, the server 26 performs a comparison between the new communication and historical communications. For example, the comparison may comprise determining a mean and standard deviation in connection with the historical communications. The comparison may further comprise performing a computation to determine a score that is ultimately compared to a range comprising upper and lower endpoints in order to determine the similarity or not of the new communication with historical communications. If the score lies within the range, the new communication is similar to the historical communications. If the score lies outside the range, the new communication is deemed anomalous with respect to historical communications. The anomalous communication 40 is, therefore, considered risky and the communication 40 is handled differently than non-risky communications (e.g., blocked, flagged, etc.).

In some arrangements, each new communication 40 includes a Hypertext Transfer Protocol (HTTP) message exchanged between a source device and a destination device. In these arrangements, the attributes of the communication 40 which are evaluated can include time, source IP address, destination IP address, domain, HTTP POST, user-agent string, HTTP method, full URL, HTTP status code, duration, timezone, website geolocation, the amount of data transmitted, the referrer and other header information, bytes sent/received, HTTP cookie presence, referrer address, employee location, employee department, combinations thereof, as well as others.

It should be understood that, although the riskiness detection server 26 is shown in FIG. 1 as residing off of a branch of the communications medium 28, there are a variety of suitable locations for the riskiness detection server 26 within the electronic environment 20 depending on the particular type of electronic environment 20. In some arrangements, the electronic environment 20 is large-scale enterprise network, and riskiness detection server 26 resides in one or more firewalls or gateways that separate the enterprise network from a public network in an inline manner. In other arrangements, the electronic environment 20 is a public network perhaps and the specialized firewall/gateway may separate different segments of the public network. In yet another arrangement, the electronic environment 20 is any network and the riskiness detection server 26 is simply an appliance attached to the network (e.g., a device which hooks into a network traffic blocking or filtering system, etc.). Other types of electronic environments and/or locations are suitable for use as well.

It should be further understood that, in some arrangements, the communications data that is collected and analyzed is organization-wide or even across multiple organizations (e.g., where the data is gathered at least in part from a public network). Further details will now be provided with reference to FIG. 2.

Figure 2:
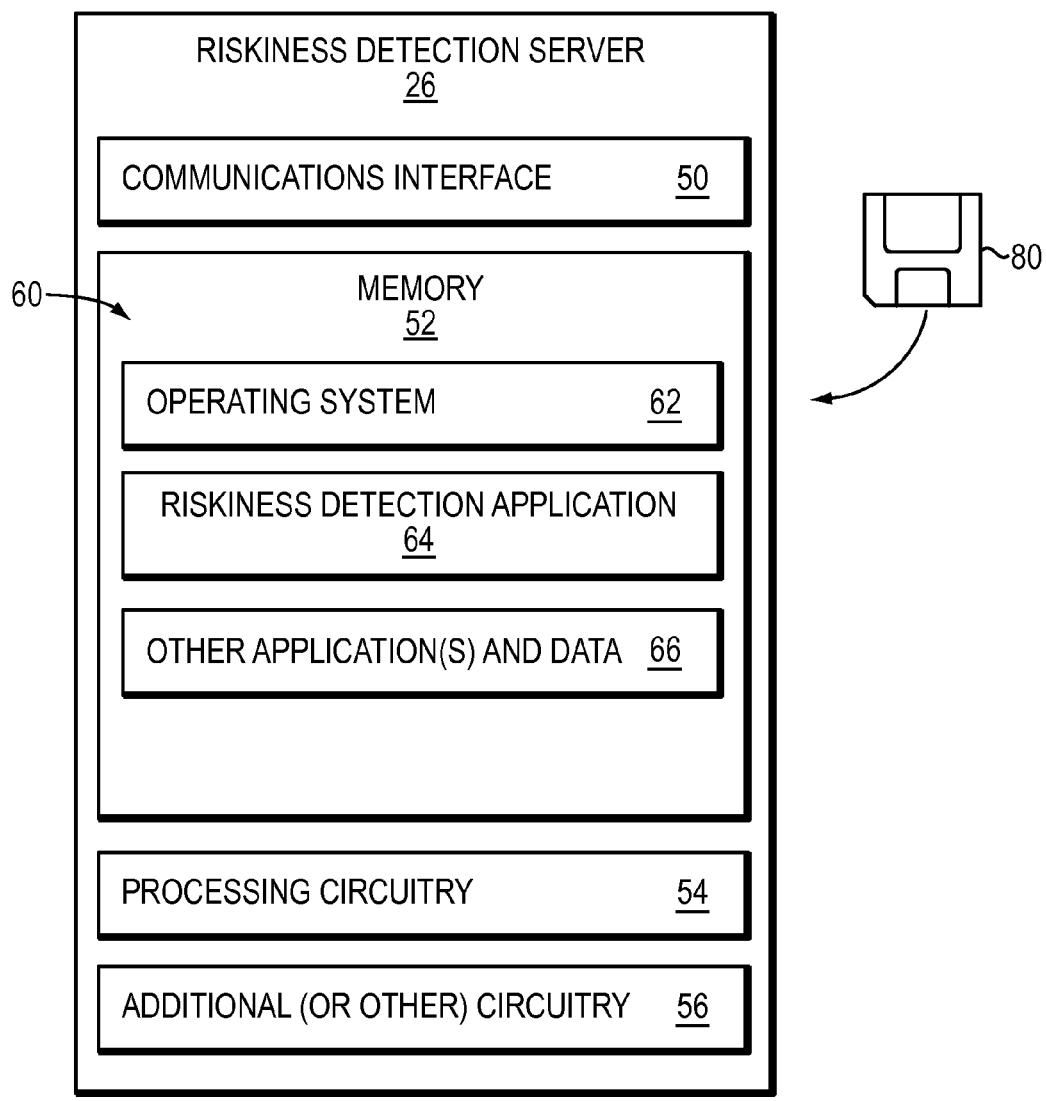
FIG. 2 is a block diagram of a riskiness detection server of the electronic environment of FIG. 1.

FIG. 2 shows particular details of the riskiness detection server 26 (also see FIG. 1). The riskiness detection server 26 includes a communications interface 50, memory 52, processing circuitry 54, and additional (or other) circuitry 56.

The communications interface 50 is constructed and arranged to connect the riskiness detection server 26 to the communications medium 28 to enable communications with other components of the electronic environment 20 (FIG. 1). Additionally, the communications interface 50 enables the riskiness detection server 26 to potentially intercept and block communications if necessary based on scores.

The memory 52 is intended to represent both volatile storage (e.g., DRAM, SRAM, etc.) and non-volatile storage (e.g., flash memory, etc.). The memory 52 stores a variety of software constructs 60 including an operating system 62 to manage resources of the riskiness detection server 26, a riskiness detection application 64 to detect risky communications 40 and other applications and data 66 (e.g., operating parameters, utilities, backend processing routines, reporting routines, etc.).

The processing circuitry 54 is constructed and arranged to operate in accordance with the various software constructs 60 stored in the memory 52. Such circuitry 54 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 60 to the riskiness detection server 26. The computer program product 80 has a non-transitory (or non-volatile) computer readable medium which stores a set of instructions which controls one or more operations of the riskiness detection server 26. Examples of suitable computer readable storage media include tangible articles of manufacture and apparatus which store instructions in a non-volatile manner such as CD-ROM, flash memory, disk memory, tape memory, and the like.

The additional circuitry 56 represents other portions of the riskiness detection server 26. For example, the riskiness detection server 26 may include a user interface to enable a user to locally operate the riskiness detection server 26.

During operation, the processing circuitry 54 runs the riskiness detection application 64 to form specialized control circuitry which performs riskiness detection of communications 40 between sources and destinations (also see FIG. 1). In particular, the riskiness detection application 64 forms and maintains a network historical record of communications within the electronic environment 20. As discussed above, the historical record for each historical communication is represented by a number.

In some arrangements, the communications 40 include HTTP messages which pass between the client devices 22 (running web browsers) and server devices 24 (running web server applications), also see FIG. 1. HTTP messages are common even in environments which restrict network communications down to only essential protocols. Furthermore, HTTP messages offer a rich set of attributes.

Additionally, the control circuitry of the riskiness detection server 26 assigns scores to new communications 40 based on comparisons of the communications 40 to the historical communications. Each risk score is a numerical measure of behavioral normalcy relative to the prior historical communications 40 occurring in the electronic environment 20.

The control circuitry further provides an output signal having a first value when a risk score lies outside a range of values (i.e., the communication 40 is considered risky), and a second value which is different than the first value when the score is within the range of values (i.e., the communication 40 is considered not risky). In this manner, the output of the riskiness detection server 26 can be used to preventing malicious activity from occurring in the electronic environment 20 in the future (e.g., by blocking communications 40, by focusing attention on certain sources of malicious activity, by prioritizing attention, etc.). Further details will now be provided with reference to FIGS. 3 and 4.

Figure 3:
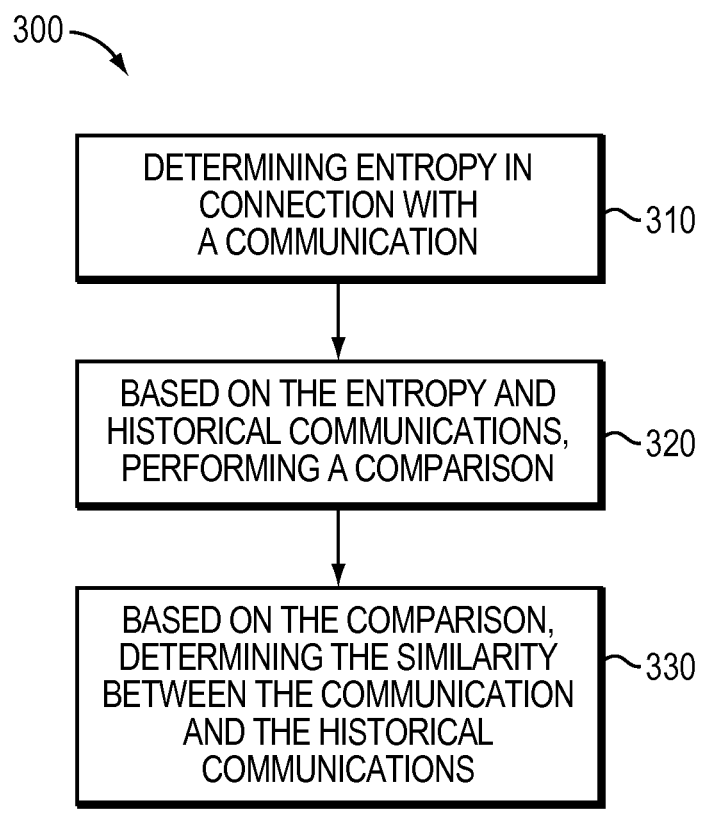
FIG. 3 is a flowchart of a procedure which is performed by the riskiness detection server of FIG. 2.

Referring to FIG. 3, there is illustrated a flow chart showing a method of carrying out the technique within the electronic environment shown in FIG. 1. In the flow diagram, the operations are summarized in individual blocks. The operations may be performed in hardware, or as processor-executable instructions that may be executed by a processor. Furthermore, the method 300 may, but need not necessarily, be implemented in the environment of FIG. 1.

At step 310, the method comprises determining entropy in connection with a communication. The step includes determining a probability of the communication seeking access with the resource. It should be understood that in this embodiment the probability is dependent on the number of visits to the resource. For example, if the resource is a page of a website, the probability is dependent on the number of visits by a particular user to the page of the website and a total number of page visits in connection with the website. The entropy in connection with the communication is represented by a value and determined based on the probability.

At step 320, the method comprises performing a comparison based on the entropy and historical communications. In this embodiment, each historical communication comprises a historical entropy value. This enables the method to perform a comparison by first determining a mean and a standard deviation in connection with the historical communications based on the historical entropy values. The method then subtracts the mean from the determined entropy in connection with the communication and divides the difference by the standard deviation in order to determine a score. The method finally compares the score to a range comprising upper and lower endpoints for enabling a similarity assessment.

At step 330, the method comprises determining the similarity between the communication and the historical communications based on the comparison. The step comprises determining whether the score lies within the range comprising the upper and lower endpoints. It should be appreciated that in this embodiment the communication will be deemed similar in the event the score lies within the range and anomalous in the event the score lies outside range.

The step 310 of determining entropy in connection with a communication will now be described in further detail. The following provides further details in connection with determining the entropy in connection with a communication that is part of a user session on a website.

A user session on a website can be described as a tuple of url requests:

$$S_u = (R_1, R_2, \ldots, R_n) \quad (1)$$

$R_i$ is $i^{th}$ request containing all the information in that request.

Looking at just the page requested, and the number of times a particular page is requested, a page based user session without any history can be described as:

$$S_{u,page} = \{(P_1, C_1), (P_2, C_2), \ldots, (P_m, C_m)\} \quad (2)$$

$P_i = i^{th}$ Page of the website,
$C_i$=Number of time page $P_i$ has been visited by this user.

Each page based user session contributes to a population of the web site that can be represented as a set of all the page based user sessions:

$$M_{u,page} = \{S_{u,page}\}_{u \in \{all\ users\}} \quad (3)$$

Writing (3) as an aggregated sum of page count for all the users a population model is created that is based on the page count aggregated over all the users of the website.

$$M_{u,page} = (P_i, C_i)_{i \in \{all\ pages\}} \quad (4)$$

$P_i = i^{th}$ Page of the website,
$C_i$=Number of time page $P_i$ has been visited by all the users.

From $M_{u,page}$ the observed probability of each page can be calculated by the following equation:

$$\text{Probability of Page } P_i = \text{Prob}(P_i) = Ci/\Sigma Ci \quad (5)$$

$Ci$=Number of page visits to page $Pi$,
$\Sigma Ci$=Total number of page visits on the web site.

Once the observed probability of each page has been determined from equation (5) then the entropy of a user session $Su$ can be determined as:

$$\text{Entropy of a user session} = \text{Entropy}(S_u) = -\Sigma \text{Prob}(P_i) * \log_2(\text{Prob}(P_i)) \quad (6)$$

It should be understood that Entropy($S_u$) gives a measure of predictability of the user session $S_u$ in a single floating point number.

The next steps 320 and 330 relating to performing a comparison based on the entropy and historical communications, and determining the similarity between the communication and the historical communications based on the comparison, will now be described in further detail. As discussed above, in this embodiment, N historical sessions can be stored as N floating point numbers that represent historical communications. By storing this historical data of user session entropy, the method is able to determine the mean ($\mu$) and standard deviation ($\sigma$) for the distribution of entropy for the user. The following steps are performed:

1. Entropy of the current session is obtained (e.g., Entropy ($S_{u,current}$)) as described above in step 310.
2. Assuming normal distribution of a user's historical entropy z-score of the current user session entropy is determined from Entropy($S_{u,current}$), $\mu$, $\sigma$ as follows:

$$\text{z-score} = \frac{\text{Entropy}(Su, \text{current}) - \mu}{\sigma}$$

3. For a strict check (since user behavior doesn't change from her own history much for a financial web site or banking web site), if z-score lies beyond −1 or 1, i.e. if z-score <−1 OR z-score >1, then the user session is anomalous.

4. For a moderate check (if user behavior changes from the history often due to new site content that's common to e-commerce sites), if z-score lies beyond −2 or 2, i.e. if z-score <−2 OR z-score >2, then the user session is anomalous.

Advantageously, the invention as described herein helps perform profile history analysis in real time using entropy based numeric representation for a user session. Storing user sessions just boils down to storing floating numbers where each floating point represents one session. This also overcomes the need to storage huge data sets.

While various embodiments of the invention have been particularly shown and described, it will be understood by those skilled in the art that various changes in form and details may be made therein without departing from the spirit and scope of the invention as defined by the appended claims.

What is claimed is:

1. A method of performing computerized authentication comprising:
   receiving, by processing circuitry, an electronic communication in connection with a computerized resource;
   upon receiving the electronic communication, determining, by processing circuitry, an entropy value relating to the electronic communication;
   determining, by processing circuitry, a mean value and a standard deviation value from historical entropy values relating to historical electronic communications in connection with the computerized resource;
   based on the entropy value, the mean value, and the standard deviation value, performing, by processing circuitry, a risk operation to determine a risk score indicating a riskiness of the electronic communication; and
   determining, by processing circuitry, an action to take in connection with the electronic communication based on the risk score.

2. The method as claimed in claim 1, wherein performing the risk operation, comprises:
   subtracting the mean value from the entropy value in connection with the electronic communication and dividing the difference between the mean and entropy values by the standard deviation value in order to determine the risk score.

3. The method as claimed in claim 2, wherein a range comprising upper and lower endpoints enables an assessment of the similarity between the electronic communication and the historical electronic communications; and
   performing the risk operation, comprises:
   determining whether the risk score lies within the range, wherein the communication is deemed similar in the event the risk score lies within the range and anomalous in the event the risk score lies outside range.

4. The method as claimed in claim 1, wherein determining the entropy value, comprises:
   determining a probability of seeking access with the computerized resource, wherein the probability is dependent on the number of visits to the computerized resource; and
   based on the probability, determining the entropy value in connection with the electronic communication.

5. The method as claimed in claim 4, wherein the probability is dependent on the number of visits to the computerized resource by a particular user and a total number of visits to the computerized resource by all users.

6. The method as claimed in claim 4, wherein the communication seeks access to a page of a website, further wherein the probability is dependent on the number of visits by a particular user to the page of the website and a total number of page visits in connection with the website.

7. An apparatus for performing computerized authentication, comprising:
   memory; and
   processing circuitry coupled to the memory, the memory storing instructions which, when carried out by the processing circuitry, cause the processing circuitry to:
   receive an electronic communication in connection with a computerized resource;
   upon receiving the electronic communication, determine an entropy value relating to the electronic communication;
   determine a mean value and a standard deviation value from historical entropy values relating to historical electronic communications in connection with the computerized resource;
   based on the entropy value, the mean value, and the standard deviation value, perform a risk operation to determine a risk score indicating a riskiness of the electronic communication; and
   determine an action to take in connection with the electronic communication based on the risk score.

8. The apparatus as claimed in claim 7, wherein performing the risk operation, comprises:
   subtracting the mean value from the entropy value in connection with the electronic communication and dividing the difference between the mean and entropy values by the standard deviation value in order to determine the risk score.

9. The apparatus as claimed in claim 8, wherein a range comprising upper and lower endpoints enables an assessment of the similarity between the electronic communication and the historical electronic communications; and
   performing the risk operation, comprises:
   determining whether the risk score lies within the range, wherein the communication is deemed similar in the event the risk score lies within the range and anomalous in the event the risk score lies outside range.

10. The apparatus as claimed in claim 7, wherein determining the entropy value, comprises:
    determining a probability of seeking access with the computerized resource, wherein the probability is dependent on the number of visits to the computerized resource; and
    based on the probability, determining the entropy value in connection with the electronic communication.

11. The apparatus as claimed in claim 10, wherein the probability is dependent on the number of visits to the computerized resource by a particular user and a total number of visits to the computerized resource by all users.

12. The apparatus as claimed in claim 10, wherein the communication seeks access to a page of a website, further wherein the probability is dependent on the number of visits by a particular user to the page of the website and a total number of page visits in connection with the website.

13. A computer program product having a non-transitory computer readable medium which stores a set of instructions for performing computerized authentication, the set of instructions, when carried out by processing circuitry, causing the processing circuitry to perform a method of:
    receiving an electronic communication in connection with a computerized resource;
    upon receiving the electronic communication, determining an entropy value relating to the electronic communication;

determining a mean value and a standard deviation value from historical entropy values relating to historical electronic communications in connection with the computerized resource;

based on the entropy value, the mean value, and the standard deviation value, performing a risk operation to determine a risk score indicating a riskiness of the electronic communication; and determining an action to take in connection with the electronic communication based on the risk score.

14. The computer program product as claimed in claim 13, wherein performing the risk operation, comprises:

subtracting the mean value from the entropy value in connection with the electronic communication and dividing the difference between the mean and entropy values by the standard deviation value in order to determine the risk score.

15. The computer program product as claimed in claim 14, wherein a range comprising upper and lower endpoints enables an assessment of the similarity between the electronic communication and the historical electronic communications; and performing the risk operation, comprises:

determining whether the risk score lies within the range, wherein the communication is deemed similar in the event the risk score lies within the range and anomalous in the event the risk score lies outside range.

16. The computer program product as claimed in claim 13, wherein determining the entropy value, comprises:

determining a probability of seeking access with the computerized resource, wherein the probability is dependent on the number of visits to the computerized resource; and based on the probability, determining the entropy value in connection with the electronic communication.

17. The computer program product as claimed in claim 16, wherein the probability is dependent on the number of visits to the computerized resource by a particular user and a total number of visits to the computerized resource by all users.

18. The computer program product as claimed in claim 16, wherein the communication seeks access to a page of a website, further wherein the probability is dependent on the number of visits by a particular user to the page of the website and a total number of page visits in connection with the website.

* * * * *